United States Patent
Benja-Athon

[11] Patent Number: 6,132,218
[45] Date of Patent: Oct. 17, 2000

[54] IMAGES FOR COMMUNICATION OF MEDICAL INFORMATION IN COMPUTER

[76] Inventor: Anuthep Benja-Athon, 210 E. 36th St. Ground Floor, New York, N.Y. 10016

[21] Appl. No.: 09/191,795

[22] Filed: Nov. 13, 1998

[51] Int. Cl.[7] .................................................. G07B 23/28
[52] U.S. Cl. ........................ 434/267; 434/272; 600/300; 600/301
[58] Field of Search .................................. 434/247, 256, 434/257, 262, 267, 269, 272; 600/300, 301

[56] References Cited

U.S. PATENT DOCUMENTS

| | | | |
|---|---|---|---|
| 4,907,973 | 3/1990 | Hon | 434/262 |
| 5,259,764 | 11/1993 | Goldsmith | 434/267 |
| 5,546,943 | 8/1996 | Gould | 128/653.1 |
| 5,609,485 | 3/1997 | Bergman | 434/262 |
| 5,740,802 | 4/1998 | Nafis | 434/262 |
| 5,766,016 | 6/1998 | Sinclair | 434/262 |
| 5,769,640 | 6/1998 | Jacobus | 434/262 |
| 5,791,907 | 8/1998 | Ramshaw | 434/262 |
| 5,791,908 | 8/1998 | Gillio | 434/262 |
| 5,800,177 | 9/1998 | Gillio | 434/262 |
| 5,800,179 | 9/1998 | Bailey | 434/262 |
| 5,853,292 | 12/1998 | Eggert | 434/262 |
| 5,882,206 | 3/1999 | Gillio | 434/262 |

*Primary Examiner*—Kien T. Nguyen
*Assistant Examiner*—Kurt Fernstrom

[57] ABSTRACT

A three-dimensional human figure depicts body parts and sites involve and affect by disease, disorder and pain wherein each part and site comprises a label, name and nomenclature express as distinct alphabetical, numerical, alphanumeric nomenclature, name, symbol of a panel of symbols and color of panel of colors. The composition of all parts and sites results in a three-dimensional coordinate system of labels, names, nomenclatures, symbols and colors on the human figurine adaptable to be stored in the memories and caches of a computer or a television henceforth devices and to be retrieved from the memories and caches to be viewed in and spatially manipulated in any and all anatomical planes and to accentuate the relevant relationship of each part and site to adjacent and distant parts and sites on the viewing screen of the devices for accurately and effectively communicating information between any persons. The label, name and nomenclature, symbol and color are a product of composition of and cataloging of the inherent and unique anatomical, physiological, neurological, neuroanatomical, neurophysiological characters of each part and site, the inherent and unique anatomical, physiological, neurological, neuroanatomical, neurophysiological relationship of adjacent parts and sites to each part and site, the inherent and unique anatomical, physiological, neurological, neuroanatomical, neurophysiological relationship of distant parts and sites to each part and site.

15 Claims, 1 Drawing Sheet

IMAGES FOR COMMUNICATION OF MEDICAL INFORMATION IN COMPUTER

FIELD OF INVENTION

A three-dimensional coordinate system of nomenclatures, names symbols and colors for identifying human body parts and sites for effective communication of medical information between any persons.

BACKGROUND OF THE INVENTION

The first objective of the present invention to provide a tool for easy, fast, effective communication of medical information between any persons including patients, physicians, and health care providers involve in diseases, disorders, illnesses and pain.

The second objective of the present invention to give a standardized means of communication of medical information between any persons involve in diseases, disorders, illnesses and pain.

The third objective of the present invention to easy, fast, effective communication of medical information between any persons including patients, physicians, and health care providers involve in aforementioned disorders the means of easy, effective, and fast communication by verbal, visual, writing, computer, computer networking, electronic communications, telecommunications, and any combination thereof.

The fourth objective is to promote the understanding of, better and faster diagnosis and treatment of disease, disorder and pain processes affecting site and related adjacent and distant sites.

Problem of health care: One of the fundamental obstacles to the resolution of the health care crisis in America is the lack of a tool to permit effective communication between patients and physicians. Even among physicians, there is immense difficulty of communicating clinical information. Furthermore, expeditious access to and transmission of medical information is lacking. As a result, there are waste, abuse, misuse of medical services, poor delivery of health care, inflation of the health care cost, impedance of the development of effective delivery of health care by health care providers. Simple and effective means of delivery of health care between providers and consumers virtually does not exist. Moreover, progress in medicine is impeded by the lack of ability to link various anatomical sites which are related in the disease, disorder and pain processes.

With technological breakthrough of this latter half of the 20th century, the method of communication between physicians and patients still is primitive. This is due to the fact that the practice of medicine is still limited to the classical method and approach used and taught to medical students, residents and physicians in medical school and hospital. No one has facilitated the communication between patients and physicians at any level of communication and either within a room, by telephone, or thousands of miles away. Effective use of computer and medical technology to allow communication between patients, physicians and other health care providers does not exist.

SUMMARY OF THE INVENTION

One of the fundamental obstacles to the resolution of the health care crisis in America is the lack of a tool to permit effective communication between patients and physicians. Expeditious access to and transmission of medical information is lacking.

A three-dimensional human figurine depicts body parts and sites involve and affect by disease, disorder and pain wherein each part and site comprises a label, name and nomenclature express as distinct alphabetical, numerical, alphanumeric nomenclature, name, symbol of a panel of symbols and color of panel of colors. The composition of said parts and sites result in a three-dimensional coordinate system of labels, names, nomenclatures, symbols and colors on said figurine adaptable to be stored in the memories and caches of a computer or a television henceforth devices and to be retrieved from said memories and caches to be viewed, spatially manipulated and to accentuate the relevant relationship of said parts and sites to adjacent and distant parts and sites on said figurine on the viewing screen of said devices for accurately pinpointing and effectively communicating information between any persons. Said label, name and nomenclature, symbol and color are the product of composition of and cataloging the inherent and unique anatomical, physiological, neurological, neuroanatomical, neurophysiological characters of said parts and sites, the inherent and unique anatomical, physiological, neurological, neuroanatomical, neurophysiological relationship of adjacent parts and sites to said parts and sites, the inherent and unique anatomical, physiological, neurological, neuroanatomical, neurophysiological relationship of distant parts and sites to said parts and site.

DESCRIPTION OF THE PREFERRED EMBODIMENTS

Figure 1:
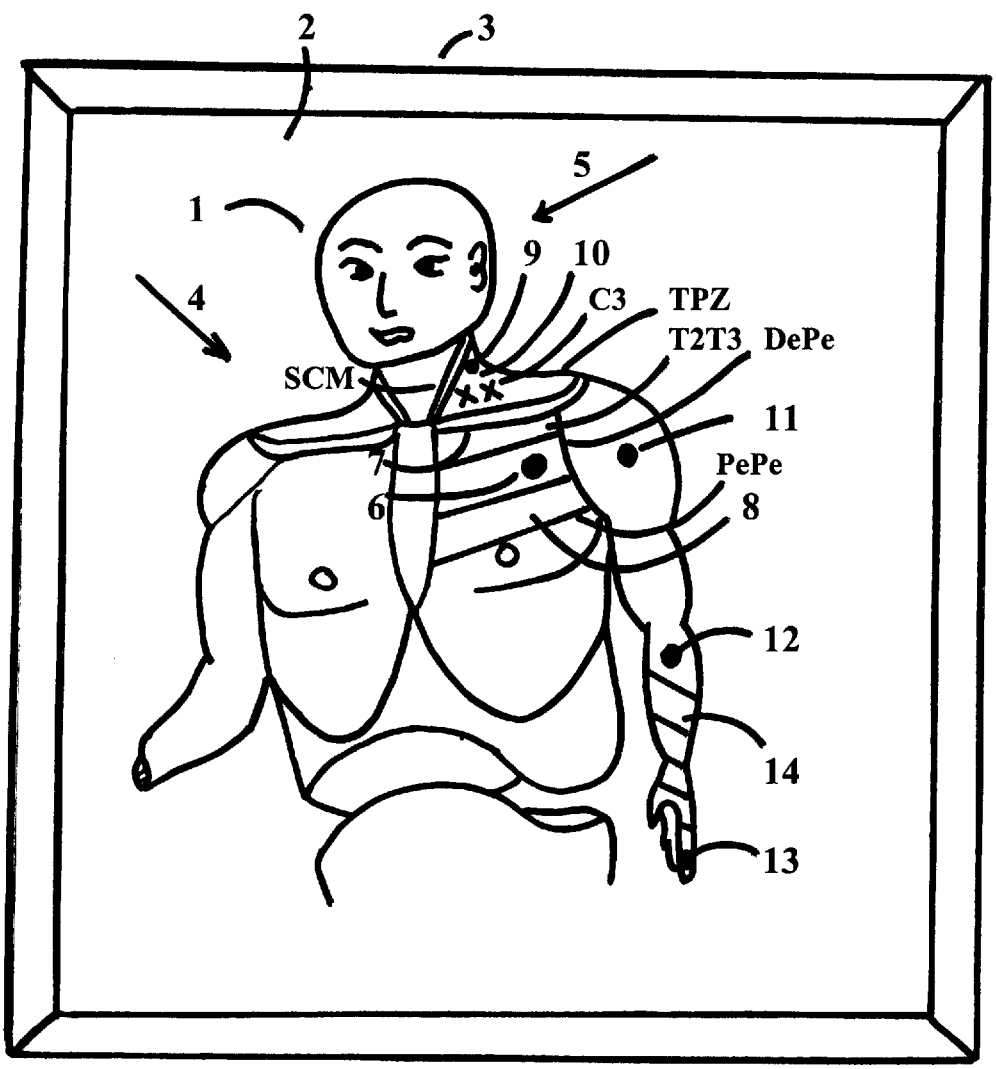
FIG. 1 is the schematic view of the present invention.

FIG. 1 shows an anterior view, a representation of the preferred embodiments of the present invention, of the upper body 1 representing a human body comprises parts and sites involve and affect by disease, disorder and pain processes on the viewing screen 2 of a computer, a television or the like henceforth devices 3. The images representing human body, parts and sites can be created in devices 3 using standard commercially available computer softwares for creating outlines and contours of said human body, parts, sites and images. Using computer softwares, human body including upper body 1 and parts and sites can be displayed and spatially manipulated as selective two- and three-dimensional images in any and all anatomical planes such as, but not limited to, lateral view 4 and posterior view 5 on screen 2. Corollary, other views can be displayed such as, but not limited to, superior, inferior, left lateral and right lateral and any combination thereof, not shown in FIG. 1, adaptable to be spatially manipulated and viewed on said screen. Further to same, selective images adaptable to be spatially manipulated and viewed on said screens in any and all anatomical planes such as, but not limited to, crosssectional, parasagittal, midsagittal and coronal planes at an angle between 0–360 degrees and at different anatomical levels. Said means of viewing facilitate the accurately and effectively communicating information between any persons on one or more anatomical sites involved in and affected by site or sites' specific diseases, disorders and pain.

In FIG. 1, part and site 6 is a representation of the preferred embodiments of the present invention. Part and site 6 is involved and affected by disease, disorder and pain processes and is identified on the viewing screen 2. The product of composition of and cataloging the inherent and unique anatomical, physiological, neurological, neuroanatomical, neurophysiological characters of part and site 6 is specific label unique to part and site 6. Said production is achieved for each part and site as represents by part and site 6 as follows: First, site 6 is on the left anterior chestwall and is defined by the named anatomical cleavage DePe, PePe and left clavicle 7. Further, part and site 6 is in the dermatome T2 and T3 which define the neuroanatomical and neurophysiological character of part and site 6. The physiological and neurophysiological character of site 6 is the pain site of pectoralis major and pectoralis minor 8. Therefore, part and site 6 is assigned a distinct alphanumeric nomenclature base on said process which is DePePePe7T2T8 as one of the preferred embodiments. Further, part and site 6 can be labeled with a unique, visually distinct and contrasting symbol such as, but not limited to, line symbol. Furthermore, part and site 6 can be labeled with a unique, visually distinct and contrasting color such as, but not limited to, red color (not shown in the figure). Said composition and cataloging are written and programmed into and stored in the memories and caches of the computer or television henceforth devices and retrievable from said memories and caches to be displayed on upper body 1 on the viewing screen of the devices.

In FIG. 1, similarly, part and site 9 is another representation of the preferred embodiments of the present invention. Part and site 9 is involved and affected by disease, disorder and pain processes and is identified on the viewing screen 2. Said production is achieved for each part and site as represents by part and site 6 as follows: First, part and site 9 is on the left lateral neck and is defined by the named anatomical cleavage SCM, TPZ and left clavicle 7. Further, part and site 9 is in the dermatome C3 which define the neuroanatomical and neurophysiological character of part and site 9. The physiological and neurophysiological character of site 9 is the pain site of scalene muscles 10. Therefore, part and site 9 is assigned a distinct alphanumeric nomenclature base on said process which is SCMTPZ7C310 as one of the preferred embodiments. Further, part and site 6 can be labeled with a unique, visually distinct and contrasting symbol such as, but not limited to, cross symbol. Furthermore, part and site 9 can be labeled with a unique, visually distinct and contrasting color such as, but not limited to, blue color (not shown in the figure). Said composition and cataloging are written and programmed into and stored in the memories and caches of the computer or television henceforth devices and retrievable from said memories and caches to be displayed on upper body 1 on the viewing screen of the devices.

Said process of composition and cataloging applies to other sites and parts such as, but not limited to, parts and sites 11, 12, 13 and 14 of the human body to achieve the same objectives of the present invention as stated in the specification and claims.

Part and site 6 and part and site 9 are related by relative anatomical position of parts and sites comprises the relative locations of the named anatomical cleavages and landmarks delineating said parts and sites as described supra. This anatomical relationship of part and site 6 and adjacent part and site 9 is accentuated by the physiological, neurological, neuroanatomical, neurophysiological relationship. That is the physiological, neurological, neuroanatomical, neurophysiological of site and part 9 can affect the physiological, neurological and neurophysiological manifestation at part and site 6. In other words, site and part 9 is the cervicogenic source of said manifestation at part and site 6. Therefore, part and site 6 can be further assigned a second distinct alphanumeric nomenclature base on said process which is SCMTPZ7C310-DePePePe7T2T8 to indicate said relationship. Further, said relationship of part and site 6 and part and site 9 can be labeled with a unique, visually distinct and contrasting symbol such as, but not limited to, triangular symbol (not shown in the figure). Furthermore, said relationship of part and site 6 and part and site 9 can be labeled with a unique, visually distinct and contrasting color such as, but not limited to, gray color (not shown in the figure). Said composition and cataloging are written and programmed into and stored in the memories and caches of the computer or television henceforth devices and retrievable from said memories and caches to be displayed on upper body 1 on the viewing screen of the devices.

Corollary, said process is applicable to site and part 9 and distant sites and parts 11, 12, 13 and 14 which are distant sites and parts but relate to site an part 9 as discussed supra. As discussed supra, said process utilizes the inherent and unique anatomical, physiological, neurological, neuroanatomical, neurophysiological relationship between said distant parts and sites 11, 12, 13 and 14 and part and site 9. Further, as discussed supra, all said sites and parts can be further assigned a respective distinct alphanumeric nomenclature base on said process. Further, said relationship can be labeled with respective unique, visually distinct and contrasting symbol. Furthermore, said relationship can be labeled with a unique, visually distinct and contrasting color. Said composition and cataloging are written and programmed into and stored in the memories and caches of the computer or television henceforth devices and retrievable from said memories and caches to be displayed on upper body 1 on the viewing screen of the devices.

Base on the above process, as a representation of the preferred embodiments, a three-dimensional coordinate system of parts and sites 6, 9, 11, 12, 13 and 14 is achieved. In this representation, parts and sites 6, 9, 11, 12, 13 and 14 are a representation of certain human parts and sites involve and affect by disease, disorder and pain processes which are displayed on viewing screen 2.

Further to same, it is understood that numerous other sites and parts involve and affect will be used to produce an extensive three-dimensional coordinate system of parts and sites involve and affect by disease, disorder and pain processes in the spirit of and within the scope of the claims of the present invention. Said coordinate system is written and programmed into and stored in the memories and caches of said devices and is retrievable from said memories and caches to be viewed and spatially manipulated on screen 2. Furthermore, said the relevant relationship of said parts and sites can be accentuated by subtraction and deletion of adjacent and distant parts and sites which are irrelevant to said parts and sites. Said subtraction or deletion is reversible.

The composition and cataloging said inherent and unique characters according to the claims are the composition and cataloging the inherent and unique surface anatomy gross anatomy, microscopic anatomy, physiological constitution, neuronal innervation including autonomic innervation, afferent innervation, efferent innervation, dermatomal organization, myotomal organization, sclerotomal organization, somatoviscerals, viscerosomatics, neurosomatics, referred pain pattern, myofascial point, motor point, acupuncture point of said specific site within the anatomical boundary defined by the anatomical cleavages and landmarks of said site. In addition, the process also involve identifying adjacent and distant anatomical sites which bear distinct and unique anatomical, physiological, neurological, neuroanatomical, neurophysiological relationship of to said site. In other words more said information as the substrate for said process can be further gathered as needed to fulfill all the needs to produce said nomenclatures, labels, names, symbols and colors of all sites on figurine 1 without departing from the spirit of the invention or the scope of the claims. The result of the process of cataloging is a specific and distinct label expresses as alphabetical, numerical, alphanumeric nomenclature and name of each site expressing said site unique characters and features and said site unique and inherent relationship with adjacent sites and distant sites. The result of said processes is figurine 1 according to the claims wherein said three-dimensional human figurine comprises a three-dimensional coordinate system of named labels within the anatomical boundary defined and delineate by named anatomical cleavages and landmarks of the site represents by said label which is also visualized results in a specific and distinct label express as alphabetical, numerical, alphanumeric nomenclature, panel of symbols such as but not limited to lines, dots, iconic, typographic, mathematical, and alphabetic symbols. In addition a panel of distinct, different and contrast colors shades, tones and any combination thereof can be assigned to each said site base on said cataloguing. Thereby a three-dimensional system of labels base on said processes leading to the origination of nomenclatures, names, symbols and colors on figurine 1 is originated. Said nomenclatures and names are more readily used by persons and nonhuman (henceforth included as person) familiar with technical technology such as computers and physicians. On the other hand, said panel of symbols and colors and any combination of symbols and colors are more readily recognized, better articulated and understood by anyone including laypersons such as any physicians and patients. The emphasis and use of named anatomical cleavages and landmarks on figurine 1 by the present invention facilitate and make possible said communication.

The representation of the substrate which is assigned distinctive and unique alphabetical, numerical and alphanumeric nomenclature, symbol code and color code as discussed supra is as follows:

System of Anatomical Planes such as, but not limited to: Midsagittal plane, anterior, posterior, sagittal, coronal, lateral, medial planes are used. Other planes created by line passing through anatomical landmarks of the body are as follow: eyebrows, zygomatic bones, mandibular angles, thyroid cartilage, clavicles, nipples, subcostals, umbilicus, iliac crests, pubic symphysis, patellar, malleoli, inion, mastoid processes, angle of neck, infrascapular angle, eleventh and twelfth ribs, sacroiliac joints, coccyx, ischial tuberosity, posterior knee creases, scapular spine, hyoid cartilage, acromioclavicular joints, inguinal crease, elbow crease, olecranon, distal flexor crease, proximal flexor crease, middle flexor crease, distal extensor crease, proximal extensor crease, middle extensor crease.

System of Anatomical Landmarks such as, but not limited to: eyebrow, zygomatic bone, clavicle, sternoclavicular joint, nipple, acromioclavicular joint, xiphoid process, elbow joint, umbilicus, pubic symphysis, patellar, fibular head, lateral malleolus, inion, mastoid process, scapular spine, scapular angle, iliac crest, sacroiliac joint, posterior knee crease, tendocalcaneus, superior nuchal line, inferior nuchal line, styloid process, angle of mandible, mental protuberance, base of mandible, temporalis, glabella, nasion, nasal bone, shoulder joint, elbow joint, medial epicondyle, lateral epicondyle, radial styloid, ulnar styloid, digital joints, spinous processes of vertebrae, sternum, sternal joint, costal cartilage, rectus abdominis, posterior superior iliac spine, ilioinguinal ligament, pubic tubercle, vastus lateralis, vastus medialis, semimembranosus-semitendinosus-gracilis-sartorius, lateral quadriceps, medial quadriceps, tibial tuberosity, medial malleolus.

System of Anatomical Contour and Relief such as, but not limited to: cleavages, grooves and creases formed by the boundary of muscles, groups of muscles, soft tissues, bony structures, vascular, and any combination thereof. This constant relationship between these anatomical structures forming constant anatomical contour and relief permits the identification and labeling for the purpose of anatomical localization in the present invention. This system of anatomical contour and relief creates the boundaries and delineation for localizing and coordinating the site of symptoms and signs of pain, diseases, illnesses and disorders. Nomenclature of cleavages, which is original and novel, used in this invention is made up of two spatially related named structures. This method of this nomenclature is not limited to this means and similar method can be used to produce this nomenclature. Such nomenclature are such as, but not limited to, Scalene-Trapezius=ScTr Cleavage, Occipitalis-Skull=OcSk Cleavage, Deltoid-Pectoralis major=DePe Cleavage, Deltoid-Biceps brachii=DeBi Cleavage, Pectoralis major-Biceps brachii=PeBi Cleavage, Biceps brachii-Brachialis=BiBr Cleavage, Biceps brachii-Medial triceps=BiMe Cleavage, Ilioinguinal ligament-Il Cleavage, Pectoralis major-Pectoralis minor=PePe Cleavage, Pectoralis major-Serratus anterior=PeSe Cleavage, Rectus abdominis-Costal margin=ReCo Cleavage, Serratus anterior-Costal=SeCo Cleavage, Serratus anterior-Latissimus dorsi=SeLa Cleavage, Deltoid-Pectoralis major=DePe Cleavage, Biceps Brachii-Medial triceps=BiMe Cleavage, Pectoralis major-Biceps Brachii=PeBi Cleavage, Pectoralis major-Serratus anterior=PeSe Cleavage, Serratus anterior-Latissimus dorsi=SeLa Cleavage, External oblique-Latissimus dorsi=ExLa Cleavage, Rectus abdominis-External oblique=ReEx Cleavage, Trapezius-Scapular spine=TrSc Cleavage, Rhomboideus minor-Rhomboideus major=RmRm Cleavage, Iliotibial tract-Vastus lateralis=IlVa Cleavage, Rectus femoris-Vastus medialis=ReVa Cleavage, Vastus mediali-Adductors=VaAd Cleavage, Vastus medialis-Semimembranous-Semitendinosus-AdductorLongus-Sartorius=VaSS Cleavage, Tibialis anterior-Peronei=TiPe Cleavage, Tibial bone-Tibialis anterior=TiTi Cleavage, Tensor faciae latae-Gluteus medius=TeGl Cleavage, Gluteus maximus-Gluteus medius=GlGl Cleavage, Gluteus maximus-Iliotibial tract=GlIl Cleavage, Iliotibial tract-Semimembranous=IlSe Cleavage, Quadriceps femoris-Iliotibial tract=QuIl Cleavage, Gastrocnemius-Peronei=GaPe Cleavage, Tibialis anterior-Peronei=TiPe Cleavage, Gastrocnemius-Soleus=GaSo Cleavage, Peronei-Soleus=PeSo Cleavage, Vastus medialis-Semimembranous-Semitendinosus-AdductorLongus-Sartorius=VaSS Cleavage, Gracilis-Adductors=GrAd Cleavage, Adductors-Semimembranous-Semitendinosus=AdSe Cleavage, Tibialis anterior-Tibial bone=TiTi Cleavage, Tibialis anterior-Medial gastrocnemius=TiMe Cleavage, Medial gastrocnemius-Soleus=MeSo Cleavage, Soleus-Flexor digitorum=SoFl Cleavage, Quadroceps femoris-iliotibial tract=QuIl, Gluteus maximus-iliotibial tract=GlIl, Tibialis anterior-Peronei=TiPe, Gastrocnemius-Peronei=GaPe, Gastrocnemius-Soleus=GaSo, Peronei-Soleus=PeSo, TA-PI=Tibialis anterior-Peronei, TA-AT=Tibialis anterior-Anterior tibial bone.

System of Gross Anatomy by Joints and Ligaments such as, but not limited to: sternoclavicular, acromioclavicular, elbow, sacroiliac, temporomandibular, glenohumeral, sternocostal, radioulnar, radiocarpal, knee, ankle, tarsometatarsal, atlanto-axis, costovertebra, craniovertebral, atlas, vertebral, intervertebral, lumbosacral, sacrococcygeal, pelvis, ossicles of ear, interchondral, manubriosternal, xipbisternal, costosternal, costotransverse, crico-arytenoid, cricothyroid, hip, patellar, calcaneocuboid, intermetatarsal, interphalangeal, intertarsal, metatarsophalangeal, subtalar (talocalcanean). talocalcanean, talo-calcaneo-navicular, talonavicular, transverse tarsal, tibiofemoral, tibiofibular, sternoclavicular, shoulder, distal radio-ulnar, radiocarpal, ulnocarpal, transverse carpal, intercarpal, carpometacarpal, metacarpo-phalangeal, proximal intermetacarpal, distal interphalangeal.

System of Gross Anatomy of Bursae is such as, but not limited to: subhyoid, subscapularis, interosseous cubital, bicipitoradial, iliopectineal, psoas, knee, sartorius, knee, medial ligament, knee, prepatellar subcutaneous, knee, subpatellar, knee, infrapatellar, subcutaneous, knee, pes anserine, subscapular, subtendinous bursa teres major, latissimus dorsi, interspinous, C1-S1, subtendinous bursa triceps, olecranon, obturator internus, obturator externus, vastus lateralis, extensor carpi radialis brevis, proximal, metacarpal heads, ischial tuberosity, gastrocnemius, medial, gastrocnemius, lateral, popliteus, tendocalcaneus, subcutaneous calcanean, gluteus maximus, subcutaneous, trochanteric, quadriceps, biceps femoris, extensor carpi radialis brevis, distal, knee, infrapatellar, deep, subacromial, subdeltoid, subgluteus maximus, subgluteus medius, subgluteus minimus.

System of Neurophysiologically and Neuroanatomically Related System such as, but not limited to CR11 trapezius, CR11 sternocleidomastoid, CR11 trapezius, lower part, CR11 trapezius, middle part. 113 CR5 temporalis, CR5 pterygoid medial, CR5 pterygoid lateral, superior head, CR5 masseter, CR5 tensor tympanic, CR5 digastric, anterior head, CR5 mylohyoid, CR5 pterygoid lateral, inferior head, CR5 Teeth, Upper and Lower, CR5 tensor veli palatini, CR5 tensor palati, CR7 depressor nasalis, transverse part, CR7 digastric, posterior head, CR7 auricularis, anterior, CR7 auricularis, superior, CR7 procerus, CR7 orbicular oris, CR7 zygomaticus, CR7 occipitofrontal, CR7 risorius, CR7 orbicularis oculi, CR7 depressor anguli oris, CR7 auricularis, superior, CR7 depressor septi, CR7 corrugator supercilii, CR7 buccinator, CR7 levator anguli oris, CR7 depressor labii inferioris, CR7 depressor anguli oris, CR7 depressor nasalis, alar part, CR7 mentalis, CR7 stapedius, CR7 stylohyoid, CR7 temperoparietal, CR7 triangularis, CR7 levator labii superioris, CR7 levator labii super alaeque nasi, CR7 levator anguli oris, CR7 epicranius, CR9 stylopharyngeus, CR10 constrictors of pharynx, CR10 thyro-arytenoid, CR10 thyro-epiglotticus, CR10 vocalis, CR10 superior constrictor, CR10 levator palati, CR10 palatoglossus, CR10 palatopharyngeus, CR10 cricothyroid, CR10 crico-arytenoideus posterior, CR10 crico-arytenoideus lateralis, CR10 aryepiglotticus, CR10 arytenoideus, CR12 chondroglossus, CR12 styloglossus, CR12 styloglossus, CR12 genioglossus, CR12 geniohyoid, CR12 hyglossus. 120, 137 C1 rectus capitis posterior minor, C1 obliquus capitis inferior, C1 obliquus capitis superior, C1 rectus capitis posterior major, C1,2,3 omohyoid, C1,2,3 thyrohyoid, C1,2,3 sternohyoid, C1,2,3 sternothyroid, C2C7 scalenus posterior, C2C7 scalenus medius, C2C7 scalenus minimus, C2C7 scalenus anterior, C34 levator scapulae, splenius capitis, splenius cervicis, semispinalis, rectus capitis anterior, rectus cervicis, rectus capitis lateralis, longissimus, longus capitis, longus colli (cervicis), C34,2 diaphragm, C34,2 trapezius, CR7 platysma, C5 supraspinatus, C5 subclavius, C5 infraspinatus, C5 rhomboideus, minor, C5 rhomboideus, major, C56 pectoralis major, clavicular part, C56 subscapularis, C56 teres minor, C56 biceps brachii, short head, C56 biceps brachii, long head, C56 teres major, C56 brachioradialis, C56 brachialis, C56 deltoid, posterior head, C56 deltoid, anterior head, C57 coracobrachialis, C6 serratus anterior, C678 pectoralis major, sternal part, C78 pectoralis major, lower part, C78 latissimus dorsi, C8T1 pectoralis minor, C6 serratus anterior, T1T4 serratus posterior, superior, C78 latissimus dorsi, T9T12 serratus posterior, inferior, Erector Spinae, T10T12 obliquus abdominis internus, T6T12 obliquus abdominis externus, T6T12 rectus abdominis, T7T12 transversus abdominis, L1 pyramidalis, T12L1 quadratus lumborum, erector spinae, C56 teres minor, C56 teres major, C78 triceps brachii, long head, C78 triceps brachii, medial head, C78 triceps brachii, lateral head, C78 anconeus, C67 adductor pollicis longus, C67 extensor carpi radialis brevis, C67 extensor carpi radialis longus, C67 extensor pollicis brevis, C67 extensor carpi radialis brevis, C67 extensor carpi radialis longus, C68 extensor digitorum, C78 extensor digitorum (communis), C78 extensor pollicis longus, C78 extensor indicis, C78 extensor digiti minimi, C78 extensor carpi ulnaris, C56 brachioradialis, C56 supinator, C67 pronator teres, C67 flexor carpi radialis, C78 palmaris longus, C7T1 opponens digiti minimi, C7T1 palmaris brevis, C7T1 flexor digiti minimi brevis, C7T1 lumbricals, 3–4, C7T1 interossei, palmar, C7T1 abductor digiti minimi, C7T1 flexor digitorum profundus, C7T1 flexor pollicis longus, C7T1 flexor digitorum superficialis, C7T1 interossei, dorsal, C8T1 pronator quadratus, C8T1 flexor carpi ulnaris, C8T1 adductor pollicis brevis, C8T1 opponens pollicis, C8T1 Adductor pollicis, C8T1 flexor pollicis brevis, C8T1 lumbricals, 1–2, L12 psoas minor, L12 cremaster, L23 pectineus, L23 adductor longus, L23 sartorius, L23 iliacus, L234 vastus intermedius, L234 vastus medialis, L234 vastus lateralis, L234 iliopsoas, L234 rectus femoris, L24 psoas major, L34 obturator externus, L34 gracilis, L34 adductor brevis, L34 adductor magnus, anterior head, L34 articularis genus, L34 quadriceps femoris, L345 adductor magnus, posterior head. 101 L45S1 tensor fasciae latae, iliotibial band, L45S1 gluteus medius, L45S1 gluteus minimus, L5S1 quadratus femoris, L5S12 obturator internus, L5S12 gluteus maximus, L5S1 gemellus, inferior, L5S12 gemellus, superior, S12 piriformis, L5S1 biceps femoris, short head, L5S12 biceps femoris, long head, L5S1 semitendinosus, L5S1 semimembranosus, L58S1 extensor hallucis brevis, L5S1 extensor digitorum brevis, L45S1 plantaris, L5S1 tibialis posterior, L5S1 flexor hallucis longus, L5S1 flexor diaitorum longus, L5S1 flexor digitorum brevis, L45S1 peroneus tertius, L4S1 peroneus longus, L5S1 peroneus brevis, L5S1 tibialis posterior, L5S1 flexor hallucis longus, L5S1 flexor digitorum longus, S12 gastrocnemius, lateral, S12 gastrocnemius, medial, S12 Flexor digiti minimi brevis, S12 Abductor digiti minimi, S12 soleus, S12 quadratus plantae, S12 lumbricals, 3–4, S12 adductor hallucis, S12 interossei, L45S1 tibialis anterior, L45S1 extensor digitorum longus, L45S1 popliteus, L45S1 plantaris, L5S1 flexor digitorum brevis, L5S1 abductor hallucis, L5S1 flexor hallucis brevis, L5S1 lumbricals, S1S2S3 perineum.

System of Dermatomes of Cranial nerves I–XII and sensor nerves C1–C6, T1–T12, L1–L5, and S1–S5, Co1–Co4.

System of Myofascial trigger Points and the Referred Pain Pattern such as, but not limited to: pectoralis major, tibialis anterior, popliteus, obliquus abdominis externus, tensor fasciae latae, rectus femoris, quadriceps femoris, peroneus longus, triceps brachii, gluteus medius, gluteus maximus, latissimus dorsi, biceps femoris, long head, semitendinosus, gastrocnemius, lateral, gastrocnemius, medial, lumbricales, foot, erector spinae, teres minor, teres major, occipitalis, trapezius, splenius, rectus capitis posterior, sternocleidomastoid, gluteus minimus, peroneus tertius, peroneus brevis, infraspinatus, articularis genu, aryepiglotticus, arytenoideus, auriculares, biceps brachii, brachialis, brachioradialis, buccinator, bulbocavernosus, bulbospongiosus, chondroglossus, coccygeus, constrictors of pharynx, coracobrachialis, corrugator supercilii cremaster, crico-arytenoideus lateralis, crico-arytenoideus posterior, cricopharrngeus, cricothyroid, cricothyroid intrinsic, dartos, deltoid, depressor anguli oris, depressor labii inferior, diaphragm, digastric, anterior, digastric, posterior, dilatator pupillae, epicranius, extensor pollicis, extensor carpi radiales, extensor digitorum brevis, extensor digiti minimi, extensor digitorum hallucis longus, extensor carpi ulnaris, extensor digitorum, extensor digitorum hallucis brevis, extensor indicis, flexor ulnaris, flexor carpi radialis, flexor digitorum longus, flexor digiti guinti, flexor pollicis longus, flexor accessorius, flexor pollicis brevis, flexor superficialis (sublimis), flexor hallucis brevis, flexor digitorum profundus, flexor digitorum brevis, frontalis, genioglossus, geniohyoid, hyoglossus, hypothenar, iliacus, iliococcygeus, iliocostalis, infrahyoid, intercostal, interossei, hand, interossei, foot, interspinales, intertransverse intertransversarii, ischiocavernosus, ischiococcygeus, sartorius, adductor longus, pectineus, iliopsoas, gracilis, adductor brevis, obturator externus, adductor magnus, extensor digitorum longus, plantaris, quadratus femoris, tibialis posterior, flexor digitorum longus, biceps femoris, short head, gemellus, inferior, flexor hallucis longus, obturator internus, gemellus, superior, levator labii super, alaeque nasi, levator palati, levator palpebrae superioris, levator costae, levator anguli oris, levator scapulae, levator ani, levator labii superioris, levator anguli oris, longissimus, longus colli (cervicis), longus capitis, masseter, mentalis, multifidus, mylohyoid, obliquus capitis, obliquus abdominis internus, obturator internus, omohyoid, opponens pollicis, orbicularis oculi, orbitalis orbicularis oris, palatoglossus, palatopharyngeus, palmaris longus, palmaris brevis, palpebral tarsal, pectinati, pectoralis minor, perineal, deep, perineal, supercifial, platysma, prevertebral, procerus, pronator teres, pronator quadratus, psoas minor, psoas major, pterygoid medial, pterygoid lateral, pubococcygeus, puborectalis, pyramidalis, quadratus lumborum, quadratus plantae, recto-urethral, rectus capitis lateralis, rectus oculi, rectus abdominis, rectus capitis anterior, rectus cervicis, rhomboideus, major, rhomboideus, minor, risorius, rotatores, piriformis, soleus, salpingopharyngeus, scalenus anterior, scalenus medius, scalenus posterior, semispinalis, semimembranosus, serratus anterior, serratus posterior, sphincter ileocecal, sphincter cloacae, sphincter ani internus, sphincter urethrae, sphincter ani externus, spinalis, stapedius, sternalis, sternohyoid, stemomastoid, sternothyroid, styloglossus, stylohyoid, stylopharyngeus, subclavius, subcostalis, subscapularis, superior constrictor, supinator, supraspinatus, tarsal superior, tarsal inferior, temporalis, tensor tarsi, tensor palati, tensor tympani, thenar, thyro-epiglotticus, thyro-arytenoid, thyrohyoid, transversospinalis, transversus abdominis, transversus thoracis, triangularis, triceps surae, trigonal, vocalis, zygomaticus.

System of Motor Points such as, but not limited to, tibialis anterior, pectoralis major, biceps brachii, flexor carpi radialis, obliquus abdominis externus, rectus abdominis, tensor fasciae latae, quadriceps femoris, adductor magnus, occipitalis, trapezius, splenius, deltoid, triceps brachii, brachioradialis, gluteus medius, gluteus maximus, biceps femoris, long head, popliteus, gastrocnemius, lateral, gastrocnemius, medial, soleus, flexor pollicis brevis, flexor ulnaris, articularis genu, aryepiglotticus, arytenoideus, auriculares, brachialis, buccinator, bulbocavernosus, bulbospongiosus, chondroglossus, coccygeus, constrictors of pharynx, coracobrachialis, corrugator supercilii, cremaster, crico-arytenoideus lateralis, crico-arytenoideus posterior, cricopharyngeus, cricothyroid, cricothyroid intrinsic, dartos, depressor anguli oris, depressor labii inferior, diaphragm, digastric, anterior, digastric, posterior, dilatator pupillae, epicranius, erector spinae, extensor pollicis, extensor carpi radiales, extensor digitorum brevis, extensor digiti minimi, extensor digitorum hallucis longus, extensor carpi ulnaris, extensor digitorum, extensor digitorum hallucis brevis, extensor indicis, flexor digitorum longus, flexor digiti quinti, flexor pollicis longus, flexor accessorius, flexor superficialis, flexor hallucis brevis, flexor digitorum profindus, flexor digitorum brevis, frontalis, genioglossus, geniohyoid, hyoglossus, hypothenar, iliacus, iliococcygeus, iliocostalis, infrahyoid, infraspinatus, intercostal, interossei, hand, interossei, foot, interspinales, intertransverse, ischiocavernosus, ischiococcygeus, sartorius, adductor longus, pectineus, iliopsoas, gracilis, adductor brevis, obturator externus, gluteus minimus, extensor digitorum longus, plantaris, peroneus tertius, peroneus brevis, quadratus femoris, tibialis posterior, flexor digitorum longus, semimembranosus, biceps femoris, short head, semitendinosus, gemellus, inferior, flexor hallucis longus, obturator intemus, gemellus, superior, latissimus dorsi, levator labii super, alaeque nasi, levator palati, levator palpebrae superioris, levator costae, levator anguli oris, levator scapulae, levator ani, levator labii superioris, levator anguli oris, longissimus, longus colli, longus capitis, lumbricales, foot, masseter, mentalis, multifidus, mylohyoid, obliquus capitis, obliquus abdominis internus, omohyoid, opponens pollicis, orbicularis oculi, orbitalis, orbicularis oris, palatoglossus, palatopharyngeus, palmaris longus, palmaris brevis, palpebral tarsal, pectinati, pectoralis minor, perineal, deep, perineal, supercifial, peroneus longus, platysma, prevertebral, procerus, pronator teres, pronator quadratus, psoas minor, psoas major, pterygoid medial, pterygoid lateral, pubococcygeus, puborectalis, pyramidalis, quadratus lumborum, quadratus plantae, recto-urethral, rectus capitis posterior, rectus capitis lateralis, rectus femoris, rectus oculi, rectus capitis anterior, rectus cervicis, rhomboideus, major, rhomboideus, minor, risorius, rotatores, piriformis, salpingopharyngeus, scalenus anterior, scalenus medius, scalenus posterior, semispinalis, serratus anterior, serratus posterior, sphincter ileocecal, sphincter cloacae, sphincter ani internus, sphincter urethrae, sphincter ani externus, spinalis, stapedius, sternalis, sternocleidomastoid, sternohyoid, sternomastoid, sternothyroid, styloglossus, stylohyoid, stylopharyngeus, subclavius, subcostalis, subscapularis, superior constrictor, supinator, supraspinatus, tarsal superior, tarsal inferior, temporalis, tensor tarsi, tensor palati, tensor tympani, teres major, teres minor, thenar, thyro-epiglotticus, thyro-arytenoid, thyrohyoid, transversospinalis, transversus abdominis, transversus thoracis, triangularis, triceps surae, trigonal, vocalis, zygomaticus.

System of Acupuncture Points such as, but not limited to, B2, B10, B26, B51, B54, B60, B61, K6, K7, S1, S12, S15, S25, S34, S36, S37, S40, S43, L2, G12, G20, G21, G25, G26, G31, G32, G33, T12, XA3, Li4, Si12, Si19.

System of Gross Anatomy by Muscle Pain site is also used in the present invention: Pain, diseases, disorders can be on the muscles, the origin and insertion sites of these muscles, the tendomuscular junctions, tendons, aponeuroses of the muscles and any combination thereof. Muscles used in the composition of the present invention are such as, but not limited to, the following: articularis genu, aryepiglotticus, arytenoideus, auriculares, biceps brachii, brachialis, brachioradialis, buccinator, bulbocavernosus, bulbospongiosus, chondroglossus, coccygeus, constrictors of pharynx, coracobrachialis, corrugator supercilii, cremaster, crico-arytenoideus lateralis, crico-arytenoideus posterior, cricopharyngeus, cricothyroid, cricothyroid intrinsic, dartos, deltoid, depressor anguli oris, depressor labii inferior, diaphragm, digastric, anterior, digastric, posterior, dilatator pupillae epicranius, erector spinae, extensor pollicis, extensor carpi radiales, extensor digitorum brevis, extensor digiti minimi, extensor digitorum hallucis longus, extensor carpi ulnaris, extensor digitorum, extensor digitorum hallucis brevis, extensor indicis, flexor ulnaris, flexor carpi radialis, flexor digitorum longus, flexor digiti quinti, flexor pollicis longus, flexor accessorius, flexor pollicis brevis, flexor superficialis, flexor hallucis brevis, flexor digitorum profundus, flexor digitorum brevis, frontalis, gastrocnemius, medial, gastrocnemius, lateral, genioglossus, geniohyoid, hyoglossus, hypothenar, iliacus, iliococcygeus, iliocostalis, infrahyoid, infraspinatus, intercostal, interossei, hand, interossei, foot, interspinales, intertransverse, ischiocavernosus, ischiococcygeus, sartorius, adductor longus, pectineus, iliopsoas gracilis, adductor brevis, obturator externus, quadriceps femoris, adductor magnus, tensor fasciae latae, gluteus medius, gluteus minimus, extensor digitorum longus, plantaris, tibialis anterior, popliteus, peroneus tertius, peroneus brevis, quadratus femoris, tibialis posterior, flexor digitorum longus, semimembranosus, biceps femoris, short head, semitendinosus, gemellus, inferior, flexor hallucis longus, obturator internus, biceps femoris, long head, gemellus, superior, biceps femoris, long head, gluteus maximus, latissimus dorsi, levator labii super, alaeque nasi, levator palati, levator palpebrae superioris, levator costae, levator anguli oris, levator scapulae, levator ani, levator labii superioris, levator anguli oris, longissimus, longus capitis, longus capitis, lumbricales, foot, masseter, mentalis, multifidus, mylohyoid, obliquus capitis, obliquus abdominis internus, obliquus abdominis externus, obturator internus, occipitalis, omohyoid, opponens pollicis, orbicularis oculi, orbitalis, orbicularis oris, palatoglossus, palatopharyngeus, palmaris longs, palmaris brevis, palpebral tarsal, pectinati, pectoralis minor, pectoralis major, perineal, deep, perineal, supercifial, peroneus longus, platysma, prevertebral, procerus, pronator teres, pronator quadratus, psoas minor, psoas major, pterygoid medial, pterygoid lateral, pubococcygeus, puborectalis, pyramidalis, quadratus lumborum, quadratus plantae, recto-urethral, rectus capitis posterior, rectus capitis lateralis, rectus femoris, rectus oculi, rectus abdominis, rectus capitis anterior, rectus cervicis, rhomboideus, major, rhomboideus, minor, risorius, rotatores, piriformis, soleus, salpingopharyngeus, scalenus anterior, scalenus medius, scalenus posterior, semispinalis, serratus anterior, serratus posterior, sphincter ileocecal, sphincter cloacae, sphincter ani internus, sphincter urethrae, sphincter ani externus, spinalis, splenius, stapedius, sternalis, sternocleidomastoid, sternohyoid, sternomastoid, sternothyroid, styloglossus, stylohyoid, stylopharyngeus, subclavius, subcostalis, subscapularis, superior constrictor, supinator, supraspinatus, tarsal superior, tarsal inferior, temporalis, tensor tarsi, tensor palati, tensor tympani, teres major, teres minor, thenar, thyro-epiglotticus, thyroarytenoid, thyrohyoid, transversospinalis, transversus abdominis, transversus thoracis, trapezius, triangularis, triceps brachii, triceps surae, trigonal, vocalis, zygomaticus.

System of Referred Pain Pattern: The system of referred pain which is used in the present invention is such as, but not limited to, somatosomatic, somatovisceral, viscerosomatic, psychosomatic. These patterns of referred pain are represented in the aforementioned systems of neurophysiologically and neuroanatomically related system, myotomes and sclerotomes, dermatomes, system of myofascial/trigger points and their referred pattern of involvement, motor points and acupuncture points. The pattern used in the composition of the present invention are such as, but not limited to, the following: Aorta C1-L4, Esophagus-C1-T11, Biliary C1–C6, T1-L2, Pancreas C3–C6, T2-L1, Heart T1–T3, Lung T1–T5, Stomach T6–T9, Intestine T9–T12, Intestine, Large T1-L3, S1-Co1, Rectum S2–S4, Spleen, T4–T11, Liver and Gall Bladder T6–T10, Kidney and ureter T10-L1, Bladder T11-L1, Prostate T10-S3, Epididymis T11-L1, Testes T10, Ovary T10, Appendix T11-L1, Uterus T10-S4.

System of Autonomic Innervation: The system which innervates all organs and tissues of the body. This system is applied in this invention as the neural pathways of this system follows the vascular supply and neural innervation of the body. However, the illustration of this system is represented in the aforementioned systems of neurophysiologically and neuroanatomically related system, myotomes and sclerotomes, dermatomes, system of myofascial/trigger points and their referred pattern of involvement, acupuncture points and motor points.

Although the preferred embodiments of the present invention have been mostly to illustrate on somatic sites, it will be appreciated by those skilled in the art that said preferred embodiments are to include also nonsomatic organs such as, but not limited to, visceral and neural sites in the chest, abdomen, pelvis, perineum, brain, spinal cord, eye, ears, nose, glands, vascular, lymphatics, esophagus, throat, heart, lung, mediastinum, gastrointestinal-upper, middle, and lower, liver, gall bladder, pancreas, stomach, diaphragm, omentum, kidney, ureters, ovaries, uterus, vagina, nerves, anus, scrotum, exteral genitalia, without departing from the spirit of the invention or the scope of the claims.

Although said terminology used as representation of the preferred embodiments of the present invention, it is to be understood that adaptations and variations may be made to said terminology without departing from the spirit of the invention or the scope of the claims of the present application Although the preferred embodiments include the use of nomenclatures, names and various codes have been described, it will be appreciated by those skilled in the art that adaptations and variations may be made without departing from the spirit of the invention or the scope of claims.

Although this invention has been described for communication, it will be appreciated by those skilled in the art that its application and use can be applied to diagnosis and elucidation of many of diseases and illnesses without departing from the spirit of the invention or the scope of the claims.

Although this invention has been described in human, it will be appreciated by those skilled in the art that its application and use can be applied in other living species without departing from the spirit of the invention or the scope of the claims.

What is claimed is:

1. A representation means for depicting and communicating medical information comprising:

a memory unit and a display unit;

means for storing in the memory unit and selectively displaying on the display unit in a plurality of anatomical planes three dimensional images of selected human body parts and sites affected by at least one of disease, disorder and pain processes;

means of defining the anatomical boundary of each part and site;

means of defining the anatomical position of each part and site within said anatomical boundary;

means of relating the anatomical position of each part and site to other parts and sites;

means for storing and displaying the inherent and unique anatomical, physiological, neurological, neuroanatomical and neurophysiological relationships of adjacent parts and sites;

means for storing and displaying the inherent and unique anatomical, physiological, neurological, neuroanatomical and neurophysiological relationships of distant parts and sites to each part and site; and means of assigning a unique identity to each part and site.

2. The representation means of depicting according to claim 1 wherein said means of defining the anatomical boundary of the part and site comprises named anatomical cleavages and landmarks delineating the boundary of said part and site.

3. The representation means of depicting according to claim 1 wherein said means of defining the anatomical position of the part and site within said anatomical boundary comprises the location of said part and site within said named anatomical cleavages and landmarks surrounding thence defining and delineating said anatomical position.

4. The representation means of depicting according to claim 1 wherein said means of defining the anatomical position of the part and site comprises the inherent and unique named anatomical location of and the physiological, neurological, neuroanatomical, neurophysiological characters assigned to said part and site.

5. The representation means of depicting according to claim 1 wherein said means of relating the anatomical positions of the parts and sites comprises the relative locations of the named anatomical cleavages and landmarks delineating said parts and sites.

6. The representation means of depicting according to claim 1 wherein said means of relating the anatomical positions of the parts and sites comprises the locations of the parts and sites in the anatomical cleavages and landmarks surrounding thence locating said anatomical positions.

7. The representation means of depicting according to claim 1 wherein said means of relating the anatomical positions of the parts and sites comprises the inherent and unique anatomical relationship of adjacent parts and sites.

8. The representation means of depicting according to claim 1 wherein said means of relating the anatomical positions of the parts and sites comprises the physiological, neurological, neuroanatomical, neurophysiological relationship assigned to adjacent parts and sites.

9. The representation means of depicting according to claim 1 wherein means of relating distant part and site to said part and site comprises the location of said site and part within the named anatomical cleavages and landmarks thence delineating said distant part and site to said part and site.

10. The representation means of depicting according to claim 1 wherein said means of assigning a unique identity to each part and site comprises a unique, visually distinct and contrasting label which is defined and delineated by named anatomical cleavages and landmarks of said part and site.

11. The representation means of depicting according to claim 10, wherein said label comprises a distinct and contrasting alpha, numeric and alphanumeric nomenclature.

12. The representation means of depicting according to claim 10, wherein said label comprises visually distinct and contrasting color code of a panel of color codes.

13. The representation means of depicting according to claim 10, wherein said label comprises distinct and contrasting symbol of a panel of symbols.

14. The label according to claim 10 comprises distinct and contrasting distinct color code of a panel of colors.

15. A representation means for depicting and communicating medical information comprising:

a memory unit and a display unit;

means for storing in the memory unit and selectively displaying on the display unit in a plurality of anatomical planes a spacially manipulatable three dimensional coordinate system and three dimensional images of selected human body parts and sites affected by at least one of disease, disorder and pain processes;

means of defining the anatomical boundary of each part and site;

means of defining the anatomical position of each part and site within said anatomical boundary;

means of relating the anatomical position of each part and site to other parts and sites;

means for storing and displaying the inherent and unique anatomical, physiological, neurological, neuroanatomical and neurophysiological relationships of adjacent parts and sites;

means for storing and displaying the inherent and unique anatomical, physiological, neurological, neuroanatomical and neurophysiological relationships of distant parts and sites to each part and site;

means of assigning a unique identity to each part and site; and means for selectively displaying relevant adjacent and distant parts and sites and deleting irrelevant adjacent and distant parts and sites for accurately pinpointing and effectively communicating medical information.

* * * * *